United States Patent
Mariot et al.

(10) Patent No.: US 11,597,123 B2
(45) Date of Patent: Mar. 7, 2023

(54) METHOD FOR PRODUCING SILICONE ELASTOMER MOLDS

(71) Applicant: ELKEM SILICONES FRANCE SAS, Lyons (FR)

(72) Inventors: David Mariot, Lyons (FR); Christian Maliverney, Saint Julien sur Bibost (FR); Aurélie Pelle, Pontcharra (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 427 days.

(21) Appl. No.: 16/627,427

(22) PCT Filed: Jun. 28, 2018

(86) PCT No.: PCT/FR2018/000180
§ 371 (c)(1),
(2) Date: Dec. 30, 2019

(87) PCT Pub. No.: WO2019/002705
PCT Pub. Date: Jan. 3, 2019

(65) Prior Publication Data
US 2020/0147839 A1    May 14, 2020

(30) Foreign Application Priority Data

Jun. 29, 2017   (FR) ...................................... 1700692

(51) Int. Cl.
| | | |
|---|---|---|
| *B29C 33/40* | (2006.01) | |
| *B29C 33/38* | (2006.01) | |
| *C08G 77/08* | (2006.01) | |
| *B29K 83/00* | (2006.01) | |

(52) U.S. Cl.
CPC ........ *B29C 33/405* (2013.01); *B29C 33/3878* (2013.01); *C08G 77/08* (2013.01); *B29K 2083/00* (2013.01)

(58) Field of Classification Search
None
See application file for complete search history.

(56) References Cited

U.S. PATENT DOCUMENTS

| | | | |
|---|---|---|---|
| 2,985,544 A | 5/1961 | De Monterey | |
| 3,127,363 A | 3/1964 | Nitzsche et al. | |
| 3,457,214 A | 7/1969 | Modic | |
| 3,542,900 A | 11/1970 | Lammers | |
| 3,919,136 A | 11/1975 | Smith | |
| 3,989,790 A * | 11/1976 | Bruner | B29C 33/3857 |
| | | | 264/225 |
| 4,064,096 A | 12/1977 | Gibard | |
| 4,515,932 A | 5/1985 | Chung | |
| 4,563,498 A | 1/1986 | Lucas | |
| 5,519,104 A | 5/1996 | Lucas | |

FOREIGN PATENT DOCUMENTS

| | | | | |
|---|---|---|---|---|
| DE | 1035358 | * | 7/1958 | ............... C08K 5/17 |
| EP | 0586153 | | 3/1994 | |
| EP | 0787766 | | 8/1997 | |
| EP | 0885933 | | 12/1998 | |
| FR | 1126411 | | 11/1956 | |
| FR | 1134005 | | 4/1957 | |
| FR | 1179969 | | 5/1959 | |
| FR | 1189216 | | 10/1959 | |
| FR | 1198749 | | 12/1959 | |
| FR | 1226745 | | 7/1960 | |
| FR | 1311578 | | 12/1962 | |
| FR | 1418114 | * | 11/1965 | ......... B29C 33/0011 |
| FR | 1506679 | | 12/1967 | |
| FR | 2014172 | | 4/1970 | |
| FR | 2272145 | | 12/1975 | |
| FR | 2300114 | | 9/1976 | |
| FR | 2587351 | | 3/1987 | |
| FR | 2715407 | * | 7/1995 | ........... B29C 33/405 |
| GB | 2032936 | * | 10/1978 | .............. C08L 83/04 |
| JP | 50-66553 | | 6/1975 | |
| WO | 03/074602 | | 9/2003 | |
| WO | 2006/106238 | | 10/2006 | |
| WO | WO-2016166336 A1 | * | 10/2016 | .............. C08G 77/08 |

OTHER PUBLICATIONS

WO2016166336 (Cannas) Oct. 2016 (online machine translation), [Retrieved on Feb. 16, 2022], Retrieved from: Espacenet (Year: 2016 ).*
Di-n-propylamine. (Nov. 6, 2015). Alfa Aesar. https://www.alfa.com/en/catalog/L15808/ (Year: 2015).*
Dihexylamine. (Aug. 25, 2004). MilliporeSigma / Sigma Aldrich. https://www.sigmaaldrich.com/NL/en/product/aldrich/131202 (Year: 2004).*
FR-1,418,114 (Poulenc) Nov. 1965 (online machine translation), [Retrieved on Apr. 27, 2022], Retrieved from: Espacenet (Year: 1965).*
DE-1,035,358, (Gerhard) Jul. 1958 (online machine translation), [Retrieved on Apr. 27, 2022], Retrieved from: Espacenet (Year: 1958).*
FR-2,715,407 (Pierre-Michelet) Jul. 1995 (online machine translation), [Retrieved on Apr. 24, 2022], Retrieved from: Espacenet (Year: 1995).*
International Search Report and Written Opinion dated Oct. 4, 2018 in corresponding International Patent Application No. PCT/FR2018/000180, filed Jun. 28, 2018, 16 pages.

* cited by examiner

*Primary Examiner* — Alison L Hindenlang
*Assistant Examiner* — Andrés E. Behrens, Jr.
(74) *Attorney, Agent, or Firm* — Sheppard, Mullin, Richter & Hampton LLP

(57) ABSTRACT

Silicone compositions are described for the production of negative molds that include a silicone elastomer. The molds can be used in the production of molded articles.

14 Claims, No Drawings

METHOD FOR PRODUCING SILICONE ELASTOMER MOLDS

CROSS-REFERENCE TO PRIOR APPLICATIONS

This application is a National Stage of PCT/FR2018/000180, filed Jun. 28, 2018, and designating the United States (published on Jan. 3, 2019, as WO 2019/002705A1) which claims priority under 35 U.S.C. § 119 to French Patent Application No. FR 1700692, filed Jun. 29, 2017, each hereby expressly incorporated by reference in its entirety and each assigned to the assignee hereof.

The field of the invention relates to the use of silicone compounds for the manufacture of negative molds formed from silicone elastomer for use in the manufacture of molded articles.

Bicomponent organopolysiloxane compositions that can be used for the preparation of molds produced from silicone elastomer have already been proposed on the industrial market and in the chemical literature (FR 1 418 114 and JP 50066553). These compositions may include a variety of additives (which facilitate processing them or transforming them into elastomers), such as low viscosity dihydroxydiorganopolysiloxane oils (FR 2 272 145 and FR 2 300 114).

Patent application EP 586 153 describes a curable silicone composition comprising, in addition to the constituents which are routinely used in such a composition, reinforcing co-fillers such as acicular fillers based on CaO and $SiO_2$, or in fact on $CaSiO_3$; and ceramic-based spherical fillers, and in particular on silica-alumina ceramics.

Another approach is described in the document EP 787 766. That document describes silicone compositions which can be cured at ambient temperature by condensation in order to produce molds, further comprising the constituents which are conventionally used in this type of composition, additives selected from the group constituted by sterically hindered phenols, sterically hindered thio bisphenols, zinc dialkyl dithiophosphates, zinc diaryl dithiophosphates, aromatic amines, sterically hindered amines, or in fact preparations based on those compounds.

Patent application WO 03/074602 describes the use of silica pre-treated in a silicone composition which can be cured by polycondensation, as a stabilization agent for molds obtained from that composition.

Patent application WO 06/106238 teaches a method for stabilizing molds composed of a silicone elastomer.

Among the silicone compositions that can be cured to produce an elastomer which are known for this type of application, those which cure from ambient temperature form a category which catches the attention, because they do not have to be placed in an energy-consuming oven.

These silicone compositions are classified into 2 distinct groups: monocomponent compositions (RTV-1) and bicomponent compositions (RTV-2). The term. "RTV" the acronym for "Room Temperature Vulcanizing".

During curing, water (either supplied via moisture from the atmosphere in the case of RTV-1, or introduced into a part of the composition in the case of RTV-2) allows the polycondensation reaction to take place, which leads to the formation of the elastomeric network.

In general, monocomponent compositions (RTV-1) cure when they are exposed to the moisture of the air. Usually, the polycondensation reaction kinetics are extremely slow: these reactions are therefore catalyzed by an appropriate catalyst.

Regarding bicomponent compositions (RTV-2), these are sold and stored in the form of two components, a first component containing the basic polymer materials and the second component containing the catalyst. The two components are mixed for use and the mixture cures into the form of a relatively hard elastomer. These bicomponent compositions are well known and have in particular been described in the work by Walter Noll, "Chemistry and Technology of Silicones" 1968, $2^{nd}$ edition, pages 395 to 398.

These compositions essentially comprise 4 different ingredients:
  a reactive $\alpha,\omega$-dihydroxydiorganopolysiloxane polymer,
  a curing agent, generally a silicate or a polysilicate,
  a catalyst, and
  water.

The mechanical properties of these compositions are then adjusted by adding fillers.

Usually, the condensation catalyst is based on an organic tin compound. In fact, many tin-based catalysts have already been proposed as a catalyst for curing these RTV-1s or RTV-2s. Conventional polycondensation catalysts comprise dialkyltin compounds, in particular dialkyltin dicarboxylates such as dibutyltin dilaurate and diacetate, alkyl titanate compounds such as tetrabutyl or tetraisopropyl titanate, and titanium chelates (EP-A-0 885 93.3, U.S. Pat. Nos. 5,519, 104, 4,515,932, 4,563,498, 4,528,353).

However, alkyltin-based catalysts, while being highly efficient, and usually colorless, liquid and soluble in silicone oils, suffer from the disadvantage of being toxic (CMR2 toxic for reproduction).

In addition, in the face of a molding industry which is evolving rapidly with the development of 3D printing, fresh constraints are appearing which are linked to the increase in successive molding/demolding cycles.

For sustainable development, there is an ongoing need for improvements to methods for the preparation of negative molds produced from silicone elastomer starting from silicone compositions that cure by polycondensation in the absence of tin, while improving the resistance to successive molding/demolding cycles carried out on said molds obtained. The silicone compositions must also have suitable curing kinetics and good stability on storage. Preferably, in the absence of a release agent applied to the master to be reproduced, the negative molds produced from silicone must not adhere to said master.

Thus, one of the essential aims of the present invention is to propose a novel method for the preparation of negative molds produced from silicone elastomer that can be used for the manufacture of molded articles in which the silicone elastomer is prepared from a silicone composition that does not contain a metallic catalyst such as tin, for example, and which cures by polycondensation reactions in the presence of water (for example ambient moisture) with a curing rate that is sufficient to ensure industrial rates of production.

A further aim is to propose a novel method for forming molded articles starting from a negative mold produced from silicone elastomer having a good resistance to successive molding/demolding cycles and prepared from silicone compositions containing no tin.

A further aim is to propose silicone composition containing no tin and hardening to form a silicone elastomer in the presence of moisture with rapid surface solidification kinetics, followed by a complete core solidification, i.e. homogeneous solidification, in a manner such as to prepare negative molds produced from silicone elastomers which do not adhere on the one hand to the master to be reproduced and on the other hand to the molded articles, and thus have a good resistance to successive molding/demolding cycles and which can be used for the preparation of molded articles produced from different materials.

The invention also concerns negative molds produced from silicone elastomer for use in the manufacture of molded articles produced from different reproduction materials such as from polyester, polystyrene, polyethylene, polyvinyl chloride, polyurethane, polyurethane foam, plaster, concrete, wax and soap. This list is not limiting.

The parts molded from different reproduction materials that are obtained represent a wide variety of articles, with a utilitarian or decorative purpose, such as dashboards, armrests, furniture, or works of art.

These aims, inter alia, are achieved by means of the present invention, which concerns a method for preparing a negative mold MN produced from silicone elastomer for use in the manufacture of molded articles produced from different reproduction materials, characterized in that it comprises the following steps a) to d):

a) preparing a polyorganosiloxane composition X that can be cured to produce an elastomer by polycondensation reactions, which does not contain a metallic catalyst, and comprising:
a silicone base B comprising at least one polyorganosiloxane oil A that can be cured by a polycondensation reaction, and
a catalytically effective quantity of at least one polycondensation catalyst C, which is an organic compound having the general formula (I):

(R")$_2$NH in which the symbols R", which may be identical or different, represent aliphatic hydrocarbon radicals containing 1 to 30 carbon atoms, b) applying said polyorganosiloxane X to a master to be duplicated, optionally already covered with a release agent, c) allowing said polyorganosiloxane composition X to cure in the presence of moisture supplied by the ambient air or by the prior addition of water, in order to form a negative mold MN produced from silicone elastomer, which is an impression corresponding to the exterior contour of the master to be duplicated, and d) separating the negative mold MN produced from silicone elastomer from the master to be duplicated.

One advantage linked to the method in accordance with the invention is that the number of cycles for molding/demolding articles molded in this negative mold MN is preferably more than 37, for example when demolding polyurethane replicas.

The technique for molding in silicone elastomer consists of producing a "negative" mold, i.e. an impression, from a "positive" model termed the "master". The silicone elastomer mold that generated thereby can be used to produce many "copies" or "prints" or "replicas" from the master, with no limits as to size or undercuts.

A variety of molding techniques are known to the person skilled in the art. Examples of molding techniques that may be cited are:

"block molding", which is intended for the manufacture of self-supporting molds, produced from one or more parts, by simple casting of the composition over the initial master inside a sealed counter-mold after mixing the two parts of the RTV-2 in the liquid state. This method is preferred for relatively simple shapes without major undercuts;

"one or two-part shell molding", and

"stamping molding", which is preferred for taking an impression of inclined, vertical or overhanging masters, in general with large dimensions, or when it is impossible to move the master.

When using the compositions in accordance with the invention in this application, casting techniques or techniques for application by means of a spatula, brush or by spraying are useful.

The manufactured molds have the particular feature of reproducing the details of the masters accurately and in fine detail; furthermore, because of the non-stick nature of silicone rubber, they can improve demolding rates.

A release agent may, however, be applied to the item to be reproduced prior to molding it. These release agents are well known to the person skilled in the art. By way of non-limiting example, it is possible to use an aqueous solution of soap or a suspension of wax.

In a further aspect, the present invention concerns a method for molding replicas R, characterized in that it comprises steps a) to d) in accordance with the invention, followed by the following steps e) to h):

e) filling this negative mold MN produced from silicone elastomer with a reproduction material, f) allowing the reproduction material to harden inside the negative mold MN produced from silicone elastomer, in order to produce a replica R of the master to be duplicated, g) separating the replica R from the negative mold MN produced from silicone elastomer, and h) optionally, submitting the negative mold MN produced from silicone elastomer to steps e) to g) again, in order to form a new replica R.

An advantage linked to the method in accordance with the invention is that the number of cycles e) to g) that can be carried out with the negative mold MN produced from silicone elastomer is more than 37, for example when demolding polyurethane replicas.

Various reproduction materials are known to the person skilled in the art, such as polyester, polystyrene, polyethylene, polyvinyl chloride, polyurethane, polyurethane foam, plaster, concrete, wax and soap. This list is not limiting. Before molding, these reproduction materials are in different forms, namely liquid which is viscous to a greater or lesser extent, a dispersion, suspension, with a single or with multiple components.

More precisely, the present invention concerns an organopolysiloxane composition that can be vulcanized to form a silicone elastomer from ambient temperature by polycondensation reactions comprising:

(a) silicone base that is capable of hardening into a silicone elastomer in the presence of a catalyst by polycondensation reactions, comprising:

for 100 parts by weight of at least one α,ω-dihydroxydiorganopolysiloxane A, 0.1 to 60 parts by weight of at least one curing agent AR, and 0.001 to 10 parts by weight of water, and (b) a catalytically effective quantity of a polycondensation catalyst C.

The reactive α,ω-dihydroxydiorganopolysiloxane polymers A that may be used in the silicone bases in accordance with the invention are more particularly those having the following formula (1):

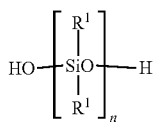  (1)

in which formula:

the substituents $R^1$, which may be identical or different, each represent a monovalent $C_1$ to $C_{13}$ hydrocarbon, which may or may not be saturated, which may or may not be substituted, aliphatic, cyclic or aromatic, and preferably $R^1$ is methyl; and n has a sufficient value to provide the polyorganosiloxane with formula (1) with a dynamic viscosity at 25° C. of 10 to 1000000 mPa·s.

It should be understood that, in the context of the present invention, a mixture constituted by a plurality of hydroxylated polyorganosiloxanes which differ among themselves by the value of the viscosity and/or the nature of the substituents bonded to the silicon atoms may be used as the reactive polyorganosiloxane A. It should also be pointed out that the hydroxylated polyorganosiloxanes with formula (1) may optionally comprise motifs T with formula $R^1SiO_{3/2}$ and/or motifs Q with formula $SiO_{4/2}$ in a proportion of at most 1% (these % expressing the number of T and/or Q motifs per 100 silicon atoms).

Reactive linear hydroxylated diorganopolysiloxane polymers A with a dynamic viscosity at 25° C. of 10 to 1000000 mPa·s and preferably from 50 to 200000 mPa·s are employed.

These basic polyorganosiloxanes are for the most part marketed by silicone manufacturers. In addition, their manufacturing techniques are well known: they are described, for example, in French patents FR-A-1 134 005, FR-A-1 198 749, and FR-A-1 226 745.

All of the viscosities in question in the present description correspond to a dynamic viscosity parameter at 25° C. known as "Newtonian", the dynamic viscosity, which is measured, in a manner which is known per se, using a Brookfield viscometer at a shear rate gradient which is sufficiently low for the measured viscosity to be independent of the speed gradient.

The substituent $R^1$ mentioned above for the reactive polyorganosiloxanes (A) may be selected from the following radicals:

alkyl and haloalkyl radicals containing 1 to 13 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl, 4,4,4,3,3-pentafluorobutyl radicals, cycloalkyl and halocycloalkyl radicals containing 5 to 13 carbon atoms, such as Cyclopentyl, cyclohexyl, methylcyclohexyl, propylcyclohexyl radicals, 2,3-difluorocyclobutyl, 3,4-difluoro-5-methylcycloheptyl, alkenyl radicals containing 2 to 8 carbon atoms, such as vinyl, allyl, buten-2-yl radicals, mononuclear aryl and haloaryl radicals containing 6 to 13 carbon atoms, such as phenyl, tolyl, xylyl, chlorophenyl, dichlorophenyl, trichlorophenyl radicals, and cyanoalkyl radicals the alkyl links of which contain 2 to 3 carbon atoms, such as β-cyanoethyl and γ-cyanopropyl radicals.

Examples radicals $R^1$ that may be cited are alkyl radicals containing 1 to 8 carbon atoms, such as methyl, ethyl, propyl, butyl, hexyl and octyl, vinyl radicals, and phenyl radicals.

Examples of substituted radicals $R^1$ that may be cited are 3,3,3-trifluoropropyl, chlorophenyl and betacyanoethyl radicals.

In the products with formula (1) in general industrial use, at least 60% by number of the radicals $R^1$ are methyl radicals, the other radicals generally being phenyl and/or vinyl radicals.

The following curing agents AR may be cited:

silanes with the following general formula (2):

  (2)

in which the symbols $R^3$, which may be identical or different, represent alkyl radicals containing 1 to 8 carbon atoms such as methyl, ethyl, propyl, butyl, pentyl, 2-ethylhexyl radicals, $C_3$-$C_6$ oxyalkylene radicals, the symbol $R^2$ representing a saturated or unsaturated, linear or branched aliphatic hydrocarbon group, a saturated or unsaturated and/or aromatic, monocyclic or polycyclic carbocyclic group, and k is equal to 0 or 1; and partial hydrolysis and condensation products of a silane with formula (2).

Examples of $C_3$-$C_6$ oxyalkylene radicals that may be cited are the following radicals:

Advantageously, the symbol $R^2$ represents a $C_1$-$C_{10}$ hydrocarbon radical encompassing:

$C_1$-$C_{10}$ alkyl radicals such as methyl, ethyl, propyl, butyl, pentyl, 2-ethylhexyl, octyl, decyl radicals, vinyl, allyl radicals, and $C_5$-$C_8$ cycloalkyl radicals such as phenyl, tolyl and xylyl radicals.

The curing agents AR with formula (2) are products that are available on the silicones market; in addition, their use in ambient temperature-curing compositions is known; they are mentioned in particular in the French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

More particularly preferred of the curing agents AR are alkyltrialkoxysilanes, alkyl silicates and alkyl polysilicates, in which the organic radicals are alkyl radicals containing 1 to 4 carbon atoms.

The alkyl silicates may be selected from methyl silicate, ethyl silicate, isopropyl silicate, n-propyl silicate and polysilicates selected from the products of partial hydrolysis and condensation of these silicates; these are polymers constituted by a large proportion of motifs with formula:

$(R^4O)_3SiO_{1/2}, R^4OSiO_{3/2}, (R^4O)_2SiO_{2/2}$ and $SiO_{4/2}$;

the symbol $R^4$ representing methyl, ethyl, isopropyl and/or n-propyl radicals. They are usually characterized on the basis of their silicon content, which is established by assaying the hydrolysis product of a sample.

Other examples of curing agents AR that may be used and that may in particular be cited are the following silanes:

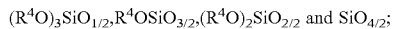

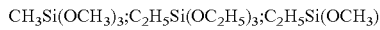

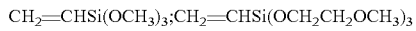

Si(OCH$_3$)$_4$;Si(OC$_2$H$_5$)$_4$;Si(OCH$_2$CH$_2$CH$_3$)$_4$;Si(OCH$_2$CH$_2$CH$_2$CH$_3$)$_4$

Si(OC$_2$H$_4$OCH$_3$)$_4$;CH$_3$Si(OC$_2$H$_4$OCH$_3$)$_3$;ClCH$_2$Si(OC$_2$H$_5$)$_3$.

Other examples of the curing agent AR that may be cited are ethyl polysilicate or n-propyl polysilicate.

In general, 0.1 to 6 parts by weight of curing agent with formula (2) are used per 100 parts by weight of reactive polymer with formula (I).

Organic compounds from the secondary amine family with the following general formula (I) may be cited as the catalyst C:

(R")$_2$NH in which the symbols R", which may be identical or different, represent aliphatic hydrocarbon radicals containing 1 to 30 carbon atoms, preferably 4 to 12 carbon atoms and more preferably those containing 6 to 10 carbon atoms.

Preferably, during step a) of the methods in accordance with the invention, the polycondensation C has the general formula (1):

(R")$_2$NH in which the symbols R", which may be identical or different, represent aliphatic hydrocarbon radicals containing 6 to 10 carbon atoms, preferably 8 to 10 carbon atoms.

The catalyst C which has just been described is used to enable or facilitate hardening into silicone elastomers, from ambient temperature, of polyorganosiloxane bases that can be cured by polycondensation reactions in the form of a bicomponent compound, the catalytic system being incorporated into one of the fractions with a curing agent AR, while the other fraction contains a reactive polyorganosiloxane A and water.

In the present invention, the term "ambient temperature" means a temperature in the range 10° C. to 40° C.

In accordance with another aspect, the invention concerns a polyorganosiloxane composition X that can be cured to produce an elastomer by polycondensation reactions, which does not contain a metallic catalyst, and which comprises:
  a silicone base B comprising at least one polyorganosiloxane oil A that can be cured by a polycondensation reaction in a manner such as to form a silicone elastomer, and
  a catalytically effective quantity of at least one polycondensation catalyst C which is an organic compound having general formula (I)

(R")$_2$NH in which the symbols R", which may be identical or different, represent aliphatic hydrocarbon radicals containing 6 to 10 carbon atoms, preferably 8 to 10 carbon atoms.

In the present invention the term "an effective quantity of at least one polycondensation catalyst C" means a quantity in the range 0.01 to 50 parts by weight of polycondensation catalyst C.

The catalysts employed in the silicone compositions used during the preparation of silicone elastomer molds in accordance with the invention mean that the following can be obtained at the same time:
  a sufficiently long pot life for using the mixture of part P1+part P2 (between 20 and 200 min.),
  "fast" curing (post-curing a maximum of +2 and SAH 24 h×100/SAP 14 days>68%),
  silicone elastomer molds obtained by the method in accordance with the invention, which means that a substantial number of parts, for example produced from polyurethane, can be molded (number of successive molding/demolding cycles>37),
  and all this in the absence of tin-based compounds.

In order to satisfy the supplemental conditions that the part containing the catalyst has to be homogeneous (transparent, single phase) and that the silicone elastomer molds obtained by the method in accordance with the invention do not stick to the master in the absence of a release agent applied to the master to be reproduced, the polycondensation catalysts C have the general formula (I):

(R")$_2$NH in which the symbols R", which may be identical or different, represent aliphatic hydrocarbon radicals containing 6 to 10 carbon atoms.

The compositions in accordance with the invention may furthermore comprise reinforcing or semi-reinforcing fillers or packing fillers CH, which are preferably selected from siliceous fillers.

The reinforcing fillers are preferably selected from fumed silicas and precipitated silicones. They generally have a specific surface area, measured using BET methods, of at least 50 m$^2$/g, preferably more than 70 m$^2$/g, a mean primary particle dimension of less than 0.1 μm (micrometers) and an apparent density of less than 200 g/liter.

These silicas may be incorporated as is or after having been treated with organosilicon compounds that are normally employed for this use. These compounds include methylpolysiloxanes such as hexamethyldisiloxane, octamethyldisiloxane, octamethylcyclotetrasiloxane, methylpolysilazanes such as hexamethyldisilazane, hexamethylcyclotrisilazane, chlorosilanes such as dimethylchlorosilane, trimethylchlorosilane, methylvinyldichlorosilane, dimethylvinylchlorosilane, alkoxysilanes such as dimethyldimethoxysilane, dimethylvinylethoxysilane and trimethylmethoxysilane.

During this treatment, the initial weight of the silicas can increase by up to an amount of 20%.

The semi-reinforcing fillers or packing fillers have a particle diameter of more than 0.1 μm (micrometer) and selected from ground quartz, calcined clays and diatomaceous earth.

In addition to the principal constituents A, AR, C and CH, non-reactive linear polyorganosiloxane polymers E may be introduced with the aim of acting on the physical characteristics of the compositions accordance with the invention and/or on the mechanical properties of the elastomers obtained from hardening these compositions.

These non-reactive linear polyorganosiloxane polymers E are well known; more particularly, they comprise: α,ω-bis(triorganosiloxy)diorganopolysiloxanes with viscosities of at least 10 mPa·s at 25° C., essentially formed by diorganosiloxy motifs and at most 1% of monoorganosiloxy and/or siloxy motifs, the organic radicals bonded to the silicon atoms being selected from methyl, vinyl and phenyl radicals, at least 60% of these organic radicals being methyl radicals and at most 10% being vinyl radicals. The viscosity of these polymers may be as high as several tens of millions of mPa·s at 25° C.; thus, they include oils with a fluid to viscous appearance, and soft to hard gums. They are prepared in accordance with the usual techniques described more precisely in the French patents FR-A-978 058, FR-A-1 025 150, FR-A-1 108 764, and FR-A-1 370 884. Preferably, α,ω-bis(trimethylsiloxy)dimethylpolysiloxane oils with a viscosity of 10 mPa·s to 1000 mPa·s at 25° C. are used. These polymers act as plasticizers and may be introduced in an amount of at most 70 parts, preferably 5 to 20 parts, per 100 parts of reactive α,ω-dihydroxydiorganopolysiloxane polymer A.

The compositions in accordance with the invention may furthermore advantageously comprise at least one silicone resin G. These silicone resins are branched organopolysiloxane polymers which are well known and commercially available. Per molecule, they have at least two different motifs selected from those with formula $R'''_3SiO_{1/2}$ (motif M), $R'''_2SiO_{2/2}$ (motif D), $R'''SiO_{3/2}$ (motif T) and $SiO_{4/2}$ (motif Q) The radicals R''' are identical or different and are selected from linear or branched alkyl radicals, vinyl, phenyl, 3,3,3-trifluoropropyl radicals. Preferably, the alkyl radicals contain 1 to 6 carbon atoms inclusive. More particular radicals R''' that may be cited are methyl, ethyl, isopropyl, tertiobutyl and n-hexyl radicals. These resins are preferably hydroxylated, and in this case have a weight content of the hydroxy group in the range 5 to 500 meq/100 g.

Examples of resins that may be cited are MQ resins, MDQ resins, ID resins and MDT resins.

In accordance with an embodiment of the invention, the polyorganosiloxane composition X comprises:

(a) the silicone base B, which is capable of hardening to form a silicone elastomer in the presence or a catalyst by polycondensation reactions comprising:

for 100 parts by weight of at least one reactive α,ω-dihydroxydiorganopolysiloxane polymer A wherein the organic radicals are hydrocarbon radicals preferably selected from the group constituted by: alkyls containing 1 to 20 carbon atoms; cycloalkyls containing 3 to 8 carbon atoms; alkenyls containing 2 to 8 carbon atoms and cycloalkenyls containing 5 to 8 carbon atoms;

0.1 to 60 parts by weight of at least one curing agent AR selected from the group constituted by: polyalkoxysilanes, the products deriving from the partial hydrolysis of a polyalkoxysilane and polyalkoxysiloxanes;

0 to 250 parts by weight, preferably 5 to 200 parts by weight, of at least one filler CH;

0.001 to 10 parts by weight of water, 0 to 100 parts by weight of at least one linear non-reactive polyorganosiloxane polymer E consisting of a linear homopolymer or copolymer wherein, per molecule, the monovalent organic substituents bonded to the silicon atoms, which may be identical or different, are selected from alkyl, cycoalkyl, alkenyl, aryl, alkylarylene and arylalkylene radicals, 0 to 20 parts by weight of coloring base or a coloration agent F, 0 to 70 parts by weight of polyorganosiloxane resins G, and 0 to 20 parts of auxiliary additives H known to the person skilled in the art, such as plasticizers, curing inhibitors, mineral oils, antimicrobial agents, heat resisting additives such as titanium, iron or cerium oxide, and (b) 0.01 to 50 parts weight of a polycondensation catalyst C.

In order to use the silicone compositions X in accordance with the invention, each composition is produced in the form of a bicomponent system formed by two parts P1 and P2 intended to be brought into contact with each other in order to produce the polycondensation-cured elastomer.

In accordance with another aspect, the present invention relates to a bicomponent system that is a precursor of the polyorganosiloxane composition X that can be vulcanized to produce a silicone elastomer from ambient temperature by polycondensation reactions, characterized in that:

it has two distinct parts P1 and P2 intended to be mixed in order to form said composition, and one of these parts comprises the catalyst C, while the other part is free from it and comprises:

per 100 parts by weight of the reactive α,ω-dihydroxydiorganopolysiloxane polymer(s) A, and 0.001 to 10 part(s) by weight of water.

In accordance with a preferred embodiment, the precursor bicomponent system of the polyorganosiloxane composition X that can be vulcanized to form a silicone elastomer from ambient temperature by the polycondensation reactions in accordance with the invention is characterized in that:

the part P1 comprises:

per 100 parts by weight of the reactive α,ω-dihydroxydiorganopolysiloxane polymer (A) wherein the organic radicals are hydrocarbon radicals preferably selected from the group constituted by: alkyls containing 1 to 20 carbon atoms; cycloalkyls containing 3 to 8 carbon atoms; alkenyls containing 2 to 8 carbon atoms and cycloalkenyls containing 5 to 8 carbon atoms;

0.001 to 10 parts by weight of water, 0 to 200 parts by weight, preferably 5 to 150 parts, of at least one filler (CH);

0 to 150 parts by weight of at least one linear non-reactive polyorganosiloxane polymer (E) consisting of a linear homopolymer or copolymer wherein, per molecule, the monovalent organic substituents, which may be identical or different between them and are bonded to silicon atoms, are selected from alkyl, cycloalkyl, alkenyl, aryl, alkylarylene and arylalkylene radicals, 0 to 70 parts by weight of polyorganosiloxane resins (G), and 0 to 20 parts by weight of a coloring base or a coloration agent F; and the part P2 comprises:

0.1 to 60 parts by weight of at least one curing agent AR selected from the group constituted by: polyalkoxysiloxanes, products deriving from the partial hydrolysis of a polyalkoxysiloxane and polyalkoxysiloxanes;

0.01 to 50 parts by weight of polycondensation catalyst C, 0 to 20 parts by weight of a coloring base or a coloration agent F, 0 to 70 parts by weight of at least one linear non-reactive polyorganosiloxane polymer (E) consisting of a linear homopolymer or copolymer wherein, per molecule, the monovalent organic substituents, which may be identical or different between them and are bonded to silicon atoms, are selected from alkyl, cycloalkyl, alkenyl, aryl, alkylarylene and arylalkylene radicals, and 0 to 125 parts by weight, preferably 0.1 to 40 parts, of at least one filler CH.

The invention also concerns the negative mold produced from silicone elastomer MN obtained at the end of step d) of the methods in accordance with the invention.

The invention also concerns the use of a negative mold produced from silicone elastomer MN obtained at the end of step d) of the methods in accordance with the invention, for the manufacture of molded articles.

Other advantages and characteristics of the present invention will become apparent from the following examples, given purely by way of non-limiting illustration.

EXAMPLES

1) Starting Materials Used

Paste preparation: Mixture of A200 fumed silica (supplied by Evonik—200 m²/g) treated with trimethylsilyl groups (approximately 30%) (CH1), 47V500 silicone oil (approximately 42%) (E1) and 48V14000 silicone oil (approximately 29%) (A1).

Sifraco® E600 (supplied by Sibelco)=quartz=silica flour, crystalline silica, ground silica (CH2)

Bluesil® FLD 48V14000 (α,ω-dihydroxydiorganopolysiloxane oil), viscosity 14000 mPa·s—MW approx 48 kg/mol (A1)

Bluesil® FLD 48V3500 (α,ω-dihydroxydiorganopolysiloxane oil), viscosity 3500 mPa·s—MW approx 30 kg/mol (A2)

Bluesil® FLD 48V750 (α,ω-dihydroxydiorganopolysiloxane oil), viscosity 750 mPa·s—MW approx 15 kg/mol (A3)

Bluesil® RP 120PA (α,ω-dihydroxydiorganopolysiloxane oil), viscosity 45 mPa·s—MW approx 0.5 kg/mol (A4)

Bluesil® FLD 47V50 (non-functional silicone oil) Viscosity 50 mPa·s, MW approx 3-4 kg/mol (E1)

Base Color 552 (supplied by Sioen)=white base color based on $TiO_2$ (F1)

Silane 51005—advanced or partially condensed ethyl silicate ($SiOEt_4$), tetraethyl ester, hydrolyzed (AR1)

Dynasilan® P (supplied by Evonik) or propyl silicate or tetra n-propylorthosilicate or tetrapropyl orthosilicate (AR2)

Mediaplast® VP 5071/A (supplied by Kettlitz Chemie)—mixture of polyalkylbenzene and high molecular weight hydrocarbons (comprises between 25% and 50% of alkylbenzene (C10-C13)) (H1)

Dimethyltin neodecanoate (supplied by Momentive)

Decylamine CAS 2016-57-1 (supplied by Sigma-Aldrich) (C1)

Dodecylamine CAS 124-22-1 (supplied by Sigma-Aldrich) (C2)

Dibutylamine CAS 111-92-2 (supplied by Sigma-Aldrich) (C3)

Dihexylamine CAS 143-16-8 (supplied by Sigma-Aldrich) (C4)

Dioctylamine CAS 1120-48-5 (supplied by Sigma-Aldrich) (C5)

Diisononylamine CAS 28454-70-8 (supplied by Sigma-Aldrich) (C6)

Didodecylamine CAS 3007-31-6 (supplied by Sigma-Aldrich) (C7)

Didecylamine CAS 1120-49-6 (supplied by Sigma-Aldrich) (C8)

2) Preparation of Examples in Accordance with the Invention and Comparative Examples:

In all of the compositions, the percentages (%) mentioned are expressed by weight with respect to the total weight of all of the constituents of the formulation.

The bicomponent precursors of the polyorganosiloxane compositions that can be vulcanized to silicone elastomers were composed of a part P1 and a part P2.

Preparation of Parts P1

The various constituents of part P1 were mixed using a DAC400 speed-mixer type appliance or using a propeller in a plastic pot.

TABLE 1

Composition of parts P1

| Composition | Part P1-1 | Part P1-2 |
|---|---|---|
| Paste | 60.2 | 60.2 |
| Sifraco E600 | 18 | 18 |
| 48V3500 | 20 | — |
| 48V14000 | — | 20 |
| Base Color 552 | 0.5 | 0.5 |
| 48V750 | 1 | 1 |
| Bluesil RP 120PA | 0.2 | 0.2 |
| Water | 0.1 | 0.1 |
| Total | 100 | 100 |

Preparation of Parts P2

The various constituents of parts P2 were manually mixed in a glass flask.

TABLE 2

Part P2 for comparative examples

| | Part P2 | | |
|---|---|---|---|
| Reference | Part P2-C1 for comparative test C1 | Part P2-C2 for comparative test C2 | Part P2-C3 for comparative test C3 |
| Catalyst | 6.6 Dimethyltin neodecanoate | 2.11 Decylamine | 2.49 Dodecylamine |
| Silane 51005 | 40 | 35 | 35 |
| Propyl silicate | | 5.3 | 5.3 |
| Mediaplast VP 5071/A | 12.95 | 13.96 | 13.87 |
| 47V50 | 40.45 | 43.63 | 43.34 |
| Total | 100 | 100 | 100 |

TABLE 3

Part P2 for examples in accordance with the invention

| Reference | P2-1 | P2-2 | P2-3 | P2-4 | P2-5 | P2-6 | P2-7 | P2-8 | P2-9 | P2-10 |
|---|---|---|---|---|---|---|---|---|---|---|
| Catalyst | 3.62 Di-isononyl-amine | 3.62 Di-isononyl-amine | 3.24 Di-octyl-amine | 3.47 Di-butyl-amine | 2.49 Di-hexyl-amine | 4 Di-decyl-amine | 9.5 Di-dodecyl-amine | 1.74 Di-butyl-amine | 2.49 Di-hexyl-amine | 4 Di-decyl-amine |
| Silane 51005 | 40 | 35 | 35 | 40 | 35 | 40 | 40 | 35 | 40 | 35 |
| Propyl silicate | | 5.3 | 5.3 | | 5.3 | | | 5.3 | | 5.3 |
| Mediaplast VP 5071/A | 13.67 | 13.6 | 13.69 | 13.7 | 13.87 | 13.58 | 12.24 | 14.06 | 13.94 | 13.5 |
| 47V50 | 42.71 | 42.48 | 42.77 | 42.83 | 43.34 | 42.42 | 38.26 | 43.9 | 43.57 | 42.2 |
| Total | 100 | 100 | 100 | 100 | 100 | 100 | 100 | 100 | 100 | 100 |

Preparation of Mixtures P1+P2

The parts P1 and P2 employed in the comparative bicomponent systems denoted Ck, in which k is 1 to 3, and the bicomponent systems in accordance with the invention, denoted Ex.m, in which m is from 1 to 11, are detailed Table 4.

TABLE 4

Composition of bicomponent systems

Bicomponent reference P1 + P2

|  | C1 | C2 | C3 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|
| Part P1 | P1-1 | P1-1 | P1-1 | P1-1 | P1-1 | P1-1 | P1-1 | P1-1 | P1-1 | P1-1 | P1-1 | P1-2 | P1-1 | P1-2 |
| Part P2 | P2-C1 | P2-C2 | P2-3 | P2-1 | P2-2 | P2-3 | P2-4 | P2-5 | P2-6 | P2-7 | P2-8 | P2-9 | P2-10 | P2-11 |

Part P1 and part P2 were mixed with a spatula for three minutes, then with a speed mixer (planetary mixer) for twenty seconds at 1800 rpm. The mixture was then vacuum degassed so that there were no defects (bubbles).

The weight ratio was 100 parts of P1 to 5 parts of P2.

Preparation of Negative Molds Produced from Silicone Elastomer:

Negative molds were produced by applying the pre-mixed formulation (mixture of part P1 and of part P2) to a master to be duplicated placed at the bottom of a pot.

45 g of part P1 and 2.25 g of part P2 were mixed with a spatula for three minutes then with a speed mixer for twenty seconds at 1800 rpm. The mixture was then degassed under a vacuum bell jar for 5 minutes so that there were no defects (bubbles, air incorporated during mixing with the spatula) in the negative mold.

A master (parallelepipedal rectangle with a height of 8 mm; a width of 35 mm and a length of 35 mm) to be duplicated was placed and centered at the bottom of a plastic pot (which had been degreased with ethanol) with a height of 27 mm and an internal diameter of 63 mm.

The master+pot were tared and between 40 and 42 g of the formulation P1+P2 was applied to the master.

The control negative molds denoted MN Ck, in which k was from 1 to 3, and the negative molds in accordance with the invention, denoted MN m, in which m was from 1 to 11, were obtained after curing the mixtures P1+P2. The mixture was allowed to cure at 23° C. for 24 hours. The negative mold produced from silicone elastomer was separated from the master to be duplicated.

the mixture could be observed) with a height of 48 mm and an internal diameter of 51 mm. The polyol part was charged and underwent decantation; it was therefore mixed with a spatula prior to use (homogeneous color and appearance without sedimentation at the bottom of the receptacle). This operation was easy to carry out manually.

12.5 g±0.1 g of the polyol part (white color) and 12.5 g±0.1 g of the isocyanate part (brown color) were weighed out. The two parts were mixed with a spatula for one minute, checking the homogeneity of the mixture (a yellow colored mixture was obtained). Two negative molds were then filled with this preparation (the cavity corresponding to the master to be duplicated was filled to the rim).

The reproduction material was allowed to harden for 90 minutes at ambient temperature inside the silicone negative molds in order to produce a first replica.

The replica was separated from the silicone negative mold by detaching each rim of the negative mold. If no adhesion to the negative mold was observed, a new replica was prepared and so on until the negative mold produced from silicone elastomer deteriorated.

3) Characterization

Characterization Tests for Mixture P1+P2

The properties of the mixture P1+P2 allowing molds to be produced from silicone elastomers were characterized by a pot life and curing kinetics expressed in Shore A Hardness.

In addition, the silicone elastomer must not adhere to the master in order to facilitate its removal from the mold. A large number of demolding operations is an indication of great durability of the silicone elastomer mold.

Measurement of Pot Life (with a "Techne Gelation Timer GT3") in Accordance with the French Standard NF T 77 107

A 22 mm diameter plunger weighing 11.4 g immersed in a sample is actuated with an alternating vertical movement

TABLE 5

Reference for control negative molds and negative molds in accordance with the invention Reference negative mold

|  | MN C1 | MN C2 | MN C3 | MN 1 | MN 2 | MN 3 | MN 4 | MN 5 | MN 6 | MN 7 | MN 8 | MN 9 | MN 10 | MN 11 |
|---|---|---|---|---|---|---|---|---|---|---|---|---|---|---|
| Reference mixture P1 + P2 | C1 | C2 | C3 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |

Preparation of Replicas:

The negative molds produced from silicone elastomer were filled first time with polyurethane casting resin (reproduction material).

F190 Fastcast polyurethane resin from Axson was prepared in transparent plastic pots (so that the homogeneity of with a period of one minute. When the consistency of the product is sufficient to support the weight of the disk for a minute, the gel point has been reached. An electrical contact then stops the timer started at the beginning of the test. This time, expressed in minutes (min), is then taken to be the pot life. A pot life of between 20 and 200 min is desired.

Measurement of Curing Kinetics

The curing kinetics were evaluated using the Shore A hardness (SAH) in accordance with the standards DIN 53505 and ISO 868. This hardness is generally measured 24 hours then 4 days and then 14 days after mixing the parts P1+P2. A hardness after 24 h equal to at least 68% of the final hardness at 14 days was desired. Hardnesses above and below the indenter are measured in order to evaluate the homogeneity of curing. Preferably, difference of 2 Shore A or less is desired.

Post-curing expresses the difference in hardness between 14 days and 4 days: a difference of 2 Shore A or less is desired for below the indenter.

Tests for Adhesion of Silicone Elastomer Mold to Master to be Reproduced:

Masters to be duplicated formed from different materials were used in order to evaluate the development of adhesion of the silicone elastomer during the preparation of the negative mold.

The evaluated materials were: an organic plastic, namely polyurethane, and plaster. For each of the materials, the master used was a parallelepipedal rectangle with a height of 8 mm, a width of 35 mm and a length of 35 mm. The surface of this part was smooth.

After 24 hours, adhesion of the negative mold to the master was evaluated qualitatively during demolding. Demolding of the master was carried out by detaching each rim of the negative mold, one after the other, in order to evaluate the resistance to demolding.

If there was no resistance, the adhesion was evaluated at 0.

If a slight force had to be applied in order to remove the master, the adhesion was evaluated as +.

If a large force had to be applied in order to remove the master, but it was possible to remove the master without tearing the silicone mold, the adhesion was evaluated as ++.

When it was not possible to demold the master without tearing the silicone mold, the adhesion was evaluated as +++.

A mark of 0 or + was desired in order to use the negative mold for the preparation of replicas.

Demolding Test:

The master used was a parallelepipedal rectangle produced from metal with a height of 8 mm, a width of 35 mm and a length of 35 mm. The surface of this part was smooth.

The test molds were produced in a method for casting the pre-mixed formulation (mixture of part P1 and of part P2) onto the metal part placed at the bottom of a pot.

After 24 hours, the master was demolded.

Six days after demolding the master, the negative molds were filled for the first time with polyurethane casting resin (reproduction material).

The polyurethane resin used to evaluate the resistance of the silicone elastomer negative mold was Fastcast F190 resin from Axson. This resin is in the form of a bicomponent product which, once mixed at ambient temperature (1:1 mixture), has a pot life of 8 minutes and can be demolded after 90 minutes.

Next, between 3 and 5 polyurethane replicas were produced each day, each time with approximately 12.5 of polyurethane resin. Each time, the replicas molded from resin were left in the silicone elastomer negative mold for a minimum of 1.5 hours in order to obtain complete polymerization.

Demolding of the molded resin replicas was carried out by detaching each rim of the silicone elastomer negative mold, one after the other, in order to evaluate the resistance to demolding.

The number of reproductions which were obtained without degradation of the silicone elastomer negative mold (i.e. without tearing off small pieces of silicone) is presented in one of the tables below. This enables the polyurethane resistance of the various silicone elastomer negative molds to be compared.

The results of the various tests carried out were as follows:

TABLE 6

The appearance of part P2 was observed visually.

| Reference | Nature of catalyst | Observations, part P2 |
|---|---|---|
| P2-C1 | Dimethyltin neodecanoate | Transparent single-phase liquid |
| P2-C2 | Decylamine | Transparent single-phase liquid |
| P2-C3 | Dodecylamine | Liquid/solid, two-phase |
| P2-1 | Diisononylamine | Transparent single-phase liquid |
| P2-2 | Diisononylamine | Transparent single-phase liquid |
| P2-3 | Dioctylamine | Transparent single-phase liquid |
| P2-4 | Dibutylamine | Transparent single-phase liquid |
| P2-5 | Dihexylamine | Transparent single-phase liquid |
| P2-6 | Didecylamine | Transparent single-phase liquid |
| P2-7 | Didodecylamine | Liquid/solid, two-phase |

TABLE 7

| | | | Curing kinetics | | | | | | |
|---|---|---|---|---|---|---|---|---|---|
| | | Pot | SAH | | | | | | SAH 24 h × |
| | Nature of | life | 24 h | | 4 days | | 14 days | | Post- | 100/SAH |
| Reference | catalyst | (min) | Below | Above | Below | Above | Below | Above | curing | 14 d (%) |
| C1 | Dimethyltin neodecanoate | 193 | 19 | 23 | 27 | 28 | 28 | 28 | +1 | 68 |
| C2 | Decylamine | 669 | Not cured | NM | Too soft. NM | Too soft. NM | 16 | 16 | At 24 hrs, not yet cured | |
| C3 | Dodecylamine | 669 | Not cured | NM | Too soft. | NM | 14 | 14 | At 24 hrs, not yet cured | |
| Ex. 1 | Diisononylamine | 90 | 19 | 20 | 24 | 25 | 26 | 26 | +2 | 73 |
| Ex. 2 | Diisononylamine | 120 | 18 | 18 | 23 | 24 | 24 | 25 | +1 | 75 |
| Ex. 3 | Dioctylamine | 125 | 18 | 17 | 23 | 24 | 25 | 26 | +2 | 72 |
| Ex. 4 | Dibutylamine | 68 | 18 | 16 | 23 | 22 | 25 | 23 | +2 | 72 |
| Ex. 5 | Dihexylamine | 134 | 17 | 17 | 23 | 23 | 24 | 25 | +1 | 71 |

TABLE 7-continued

| | | Pot life | Curing kinetics | | | | | | SAH 24 h × 100/SAH |
| | Nature of | | 24 h | | 4 days | | 14 days | | Post- | 14 d (%) |
| Reference | catalyst | (min) | Below | Above | Below | Above | Below | Above | curing | |
|---|---|---|---|---|---|---|---|---|---|---|
| Ex. 6 | Didecylamine | 109 | 17 | 18 | 23 | 24 | 25 | 26 | +2 | 68 |
| Ex. 7 | Didodecylamine | 92 | 19 | 20 | 24 | 25 | 25 | 26 | +1 | 76 |
| Ex. 10 | Didecylamine | 124 | 17 | 17 | 23 | 24 | 25 | 26 | +2 | 68 |

TABLE 8

Results of test for evaluating the adhesion of the silicone elastomer negative mold to different masters

| Reference for negative mold | Composition employed during manufacture of negative mold | Nature of catalyst used in the composition | Adhesion of silicone negative mold to polyurethane (PU) master | Adhesion of silicone negative mold to plaster master |
|---|---|---|---|---|
| MN C1 | C1 | Dimethyltin neodecanoate | 0 | 0 |
| MN C2 | C2 | Decylamine | +++ | +++ |
| MN C3 | C3 | Dodecylamine | +++ | +++ |
| MN 2 | Ex. 2 | Diisononylamine | 0 | 0 |
| MN 3 | Ex. 3 | Dioctylamine | + | 0 |
| MN 5 | Ex. 5 | Dihexylamine | + | 0 |
| MN 8 | Ex. 8 | Dibutylamine | ++ | +++ |
| MN 10 | Ex. 10 | Didecylamine | 0 | 0 |

TABLE 9

Number of successive molding/demolding cycles (durability of silicone elastomer mold)

| Reference for negative mold | Composition employed during manufacture of negative mold | Nature of catalyst used in the composition | Number of successive moldings/demoldings of articles molded from PU |
|---|---|---|---|
| MN C1 | C1 | Dimethyltin neodecanoate | 37 |
| MN C2 | C2 | Decylamine | Sticks to master - not evaluated |
| MN C3 | C3 | Dodecylamine | Sticks to master - not evaluated |
| MN 1 | Ex. 1 | Diisononylamine | 46 |
| MN 2 | Ex. 2 | Diisononylamine | 41 |
| MN 3 | Ex. 3 | Dioctylamine | 47 |
| MN 8 | Ex. 8 | Dibutylamine | 58 |
| MN 9 | Ex. 9 | Dihexylamine | 52 |
| MN 11 | Ex. 11 | Diisononylamine | 54 |

In conclusion, the catalysts employed in the silicone compositions used during the preparation of silicone elastomer molds in accordance with the invention can be used to simultaneously obtain:
a sufficiently long pot life to use the part P1+part P2 mixture (between 20 and 200 min),
"fast" curing (post-curing a maximum+2 and SAH ratio of 24 h×100/SAH 14 days>68%),
silicone elastomer molds obtained using the method in accordance with the invention which can be used to mold a large number of parts, for example from polyurethane (number of successive molding/demolding cycles>37), and all this in the absence of tin-based compounds.

In order to satisfy the supplemental conditions that the part containing the catalyst must be homogeneous (transparent single phase) and that the silicone elastomer negative molds obtained by the method in accordance with the invention must not adhere to the master even in the absence of release agent applied to the master to be reproduced, the polycondensation catalysts C satisfy the general formula (I)

(R")$_2$NH in which the symbols R", which may be identical or different, represent aliphatic hydrocarbon radicals containing 6 to 10 carbon atoms.

The invention claimed is:
1. A method of preparing a negative mold MN produced from silicone elastomer for use in the manufacture of molded articles produced from different reproduction materials, the method comprising the following steps a) to d):
a) preparing a polyorganosiloxane composition X that can be cured to produce an elastomer by polycondensation reactions, which does not contain a metallic catalyst, and comprising:
a silicone base B comprising at least one polyorganosiloxane oil A that can be cured by a polycondensation reaction, and
catalytic quantity of at least one polycondensation catalyst C, which is an organic compound having a general formula (I):

(R")$_2$NH in which the symbols R", which are identical or different, represent aliphatic hydrocarbon radicals containing 1 to 30 carbon atoms,
b) applying said polyorganosiloxane X to a master to be duplicated, optionally already covered with a release agent,
c) curing said polyorganosiloxane composition X in the presence of moisture supplied by ambient air or by a prior addition of water, in order to form the negative mold MN produced from silicone elastomer, which is an impression corresponding to the exterior contour of the master to be duplicated, and
d) separating the negative mold MN produced from silicone elastomer from the master to be duplicated,
wherein:
a) the polyorganosiloxane composition X has a pot life of between 20 and 200 minutes,
b) the curing of said polyorganosiloxane composition X, as measured by the Shore A hardness (SAH) of the negative mold MN,
i) when measured at 4 days and 14 days after mixing, the the difference in the SAH polyorganosiloxane composition X, is less than 2, and
ii) when measured 24 hours and 14 days after mixing, the, the Shore A hardness is at least 68% of the SAH measured at 14 days, and c) the negative mold MN produced can be used in greater than 37 successive molding/demolding cycles when used in demolding polyurethane replicas.

2. A method of molding replicas R, the method comprising steps a) to d) as claimed in claim 1, followed by the following steps e) to h):
 e) filling the negative mold MN produced from silicone elastomer with a reproduction material,
 f) allowing the reproduction material to harden inside the negative mold MN produced from silicone elastomer, in order to produce a replica R of the master to be duplicated,
 g) separating the replica R from the negative mold MN produced from silicone elastomer, and
 h) optionally, submitting the negative mold MN produced from silicone elastomer to steps e) to g) again, in order to form a new replica R, and
 the number of cycles of steps e) to g) that can be carried out with the negative mold MN is more than 37, when demolding polyurethane replicas.

3. The method as claimed in claim 1 wherein during step a), the polycondensation catalyst C has the general formula (I):

(R")$_2$NH in which the symbols R", which are identical or different, represent aliphatic hydrocarbon radicals containing 6 to 10 carbon atoms.

4. The method of claim 1, wherein the homogeneity of curing, as determined by measuring the Shore A hardness above and below the indenter and the difference is 2 or less.

5. The method of claim 1, wherein the at least one polyorganosiloxane oil A comprises a reactive α,ω-dihydroxydiorganopolysiloxane polymer having the general formula:

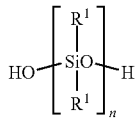

in which the substituents R$^1$, which may be identical or different, each represent a monovalent C$_1$ to C$_{13}$ hydrocarbon, which may or may not be saturated, which may or may not be substituted, aliphatic, cyclic or aromatic, and n has a sufficient value to provide the α,ω-dihydroxydiorganopolysiloxane polymer with a dynamic viscosity at 25° C. of 10 to 1000000 m Pas.

6. The method of claim 5, wherein the at least one polyorganosiloxane oil A has a dynamic viscosity at 25° C. of from 50 to 200000 m Pas.

7. The method of claim 6, wherein at least 60% by number of the radicals R$^1$ are methyl radicals.

8. The method of claim 7, where the radicals R$^1$ that are not methyl radicals are phenyl and/or vinyl radicals.

9. The method of claim 1, wherein the polyorganosiloxane composition X comprises:
 (a) a silicone base that is capable of hardening into a silicone elastomer in the presence of a catalyst by polycondensation reactions, comprising:
  for 100 parts by weight of at least one α, ω-dihydroxydiorganopolysiloxane A,
  0.1 to 60 parts by weight of at least one curing agent AR, and
  0.001 to 10 parts by weight of water, and
 (b) a catalytically effective quantity of a polycondensation catalyst C.

10. The method of claim 9, wherein the curing agent AR is:
 a) a silane with the general formula (2):

$$R^2_k Si(OR^3)_{(4-k)} \qquad (2)$$

in which the symbols R$^3$, which may be identical or different, represent alkyl radicals containing 1 to 8 carbon atoms, or C$_3$-C$_6$ oxyalkylene radicals,
 the symbols R$^2$ representing a saturated or unsaturated, linear or branched aliphatic hydrocarbon group, a saturated or unsaturated and/or aromatic, monocyclic or polycyclic carbocyclic group, and k is equal to 0 or 1; and
 b) partial hydrolysis and condensation products of a silane with formula (2).

11. The method of claim 10, wherein 0.1 to 6 parts by weight of curing agent AR are used per 100 parts by weight of the at least one polyorganosiloxane oil A.

12. The method of claim 9, wherein the compositions further comprises reinforcing fillers, semi-reinforcing fillers or packing fillers CH.

13. The method of claim 12, wherein the reinforcing fillers are fumed silicas or precipitated silicones having a specific surface area, measured using a BET method, of at least 50 m$^2$/g, a mean primary particle dimension of less than 0.1 μm (micrometers) and an apparent density of less than 200 g/liter.

14. The method of claim 12, wherein the semi-reinforcing fillers or packing fillers are selected from ground quartz, calcined clays and diatomaceous earth and have a particle diameter of more than 0.1 μm.

\* \* \* \* \*